(No Model.)

P. KIMBALL.
PROCESS OF PRODUCING FRUIT ON BARREN FRUIT TREES AND CHANGING THEIR BEARING YEARS.

No. 270,226.     Patented Jan. 9, 1883.

WITNESSES

Peter Kimball, INVENTOR

By Leggett & Leggett, ATTORNEYS

UNITED STATES PATENT OFFICE.

PETER KIMBALL, OF CLEVELAND, OHIO.

PROCESS OF PRODUCING FRUIT ON BARREN FRUIT-TREES AND CHANGING THEIR BEARING-YEARS.

SPECIFICATION forming part of Letters Patent No. 270,226, dated January 9, 1883.

Application filed October 2, 1882. (No model.)

*To all whom it may concern:*

Be it known that I, PETER KIMBALL, of Cleveland, in the county of Cuyahoga and State of Ohio, have invented certain new and useful Improvements in Process of Producing Fruit on Barren Fruit-Trees and Changing Their Bearing-Years; and I do hereby declare the following to be a full, clear, and exact description of the invention, such as will enable others skilled in the art to which it pertains to make and use the same.

My invention relates to a process for producing fruit on barren fruit-trees, and also changing their bearing-year; and it consists in operating on the limbs of said trees in a peculiar manner, as will be hereinafter fully set forth and claimed.

Figure 1:
Figure 2:
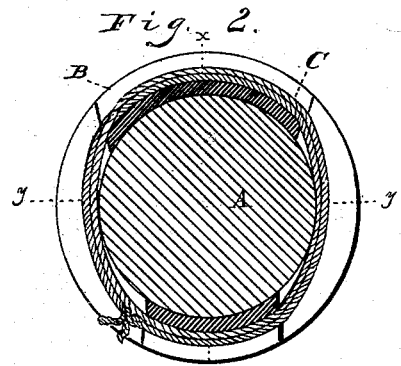
Figure 3:
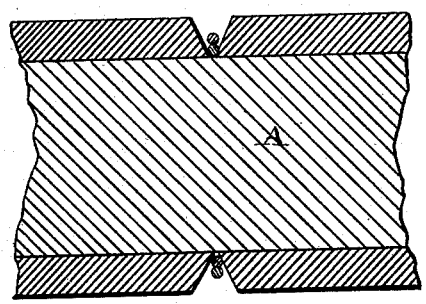
Figure 4:
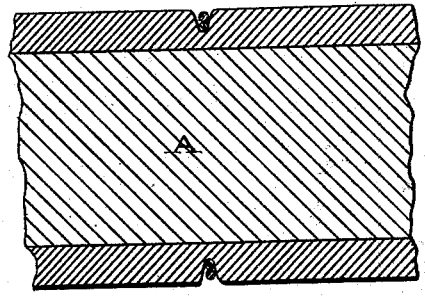

In the drawings, Figure 1 is a view of a fruit-tree the limbs of which have been operated upon. Fig. 2 is a vertical cross-section through a limb on the line of operation. Fig. 3 is a longitudinal cross-section taken through the limb on line $y\ y$, Fig. 2. Fig. 4 is a longitudinal vertical section taken on line $x\ x$, Fig. 2.

A represents the internal wood of a tree.

B represents the bark, and C represents a piece of binding material, either twine, wire, or the like, which surrounds the limb.

My process consists in making preferably a V-shaped incision through the bark of the limb that is to be operated upon into the wood. This incision is made near the lower end of the limb or near that part where it joins the trunk of the tree, and in such a manner that a portion of the bark is removed on both sides of the limb—say about one-third on each side—leaving a small piece of the bark at the lower side and a somewhat larger piece on the upper side of the limb uncut—say about one-ninth on the lower side and two-ninths on the upper side. I then pass a piece of suitable binding material around the limb at the point where the incision has been made, as shown in Fig. 2, and draw it tight enough slightly to compress the bark which has been left uncut, and also rest in the incision or cut portion. This binding material acts to prevent in a measure the return of the sap from the upper portion of the limb, and causes it to form bloom-buds for the following spring. This operation is performed at a time from fifteen days before to fifteen days after the blooming period of the tree, as in this time the fruit-buds are formed.

It will be noticed that I make the incision V-shaped. This I do in order to allow of the sap having the least possible space to pass over after the binding is removed, in order that new bark may be formed to take the place of that which has been cut away.

I do not limit myself to making the incision of the shape and in the manner described; but I so prefer to make it, as I have found it is the safest method, and is sure to produce the required result.

My binding material is removed in about five weeks after the bloom.

This process is used only on apple and pear trees.

What I claim is—

The process herein described for causing barren fruit-trees to bear and changing their bearing-years, consisting of forming a V-shaped incision on both sides of a limb through the bark and leaving a portion of the bark uncut at the upper and lower sides of the limb, and then binding a cord or the like in said incision, substantially as and for the purpose shown and described.

In testimony whereof I have signed my name to this specification in the presence of two subscribing witnesses.

PETER KIMBALL.

Witnesses:
 C. H. DORER,
 W. E. DONNELLY.